United States Patent
Ellinghaus

(10) Patent No.: US 9,150,312 B2
(45) Date of Patent: Oct. 6, 2015

(54) MOBILE SOLAR POWER STATION AND COUPLED SOLAR POWER STATIONS FOR SPACE BASED POWER GENERATION AND TRANSMISSION

(76) Inventor: Frank Werner Ellinghaus, Sinzheim (DE)

( * ) Notice: Subject to any disclaimer, the term of this patent is extended or adjusted under 35 U.S.C. 154(b) by 750 days.

(21) Appl. No.: 13/374,694

(22) Filed: Jan. 9, 2012

(65) Prior Publication Data

US 2012/0138749 A1    Jun. 7, 2012

(30) Foreign Application Priority Data

Jul. 13, 2011    (DE) .......................... 10 2011 107 208

(51) Int. Cl.
| | |
|---|---|
| B64G 1/10 | (2006.01) |
| B64G 1/00 | (2006.01) |
| B64G 1/24 | (2006.01) |
| B64G 1/40 | (2006.01) |
| B64G 1/44 | (2006.01) |
| B64G 1/64 | (2006.01) |

(52) U.S. Cl.
CPC .. *B64G 1/00* (2013.01); *B64G 1/24* (2013.01); *B64G 1/407* (2013.01); *B64G 1/443* (2013.01); *B64G 1/646* (2013.01)

(58) Field of Classification Search
CPC ........ B64G 1/407; B64G 1/1085; B64G 1/44; B64G 1/443; B64G 1/648; B64G 1/646; B64G 1/1078
See application file for complete search history.

(56) References Cited

U.S. PATENT DOCUMENTS

| | | | | |
|---|---|---|---|---|
| 3,781,647 | A | * | 12/1973 | Glaser .......................... 322/2 R |
| 8,132,762 | B2 | * | 3/2012 | Huang ........................ 244/172.7 |
| 2010/0276547 | A1 | * | 11/2010 | Rubenchik et al. ........ 244/172.8 |

FOREIGN PATENT DOCUMENTS

| | | | |
|---|---|---|---|
| DE | 10234902 | A1 * | 2/2004 |
| DE | 102004004543 | A1 * | 9/2005 |
| DE | 102005028378 | A1 * | 12/2006 |
| DE | 102005062841 | A1 * | 7/2007 |

* cited by examiner

*Primary Examiner* — Brian M O'Hara

(57) ABSTRACT

A solar sail spacecraft is designed to steer and move in space by using solar radiation pressure as a driving force, therefore allowing fuelless propulsion, station keeping and attitude control.
A solar power satellite utilizes thrusters only to stay in an rather stationary orbit. Its purpose is, to collect energy and transfer it to a given location, usually to Earth.
The intention of the present invention is to create a hybrid of a solar sail spacecraft and a power satellite for space based power generation and transmission, which is mobile and provides both, fuelless solar sailing and electric thrusters as means of propulsion.
The mobile Solar Sail Power Station serves as solar energy collector and can be connected by docking with other power stations and with a transmitter unit for energy transmission, whereby the transmitter features its own fuelless pointing and attitude control devices.

8 Claims, 6 Drawing Sheets

(foil roll, foil covered with or made of thin film solar cell arrays, connected to conductive threads)

(foil roll on roll holder)

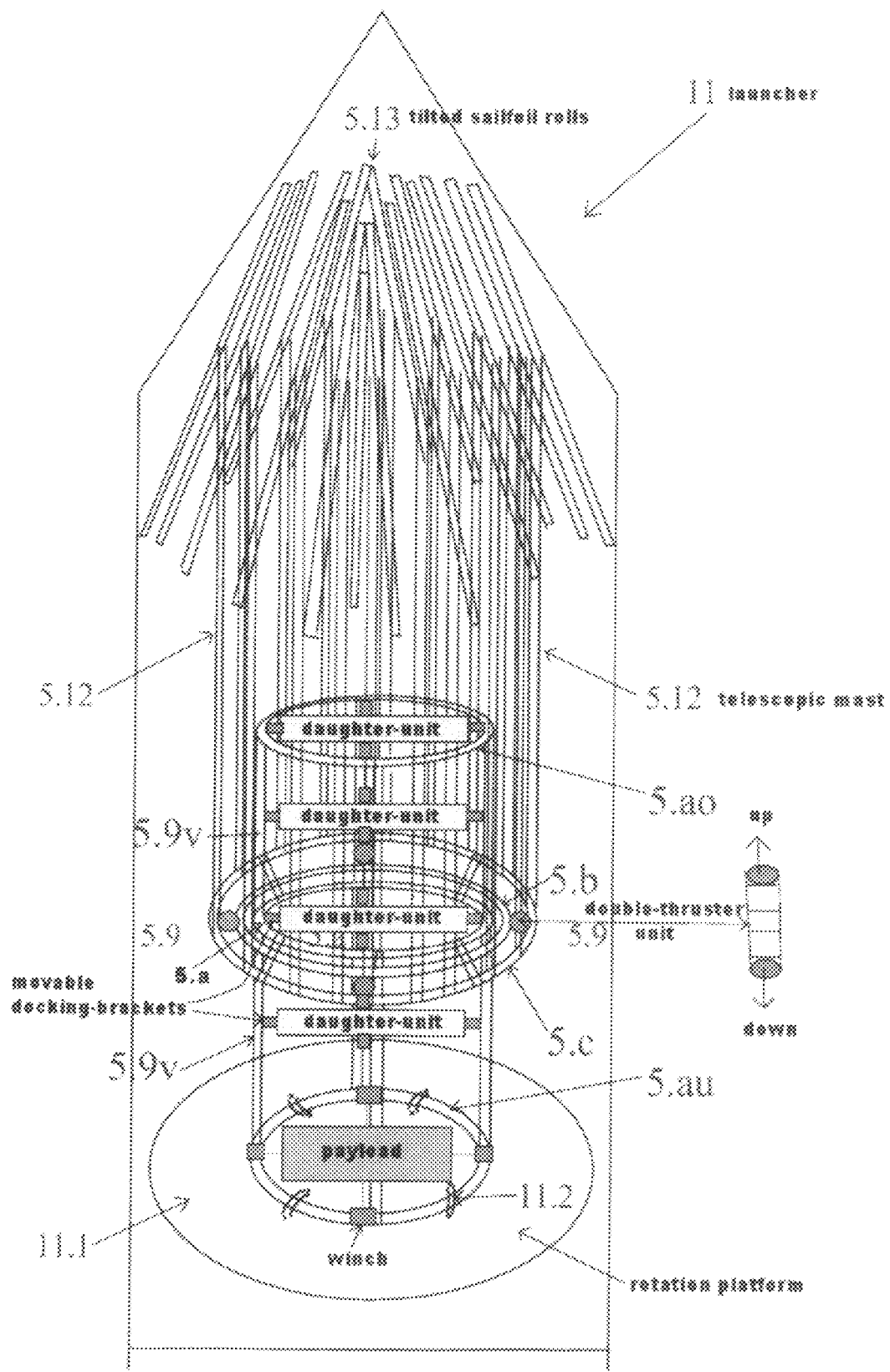

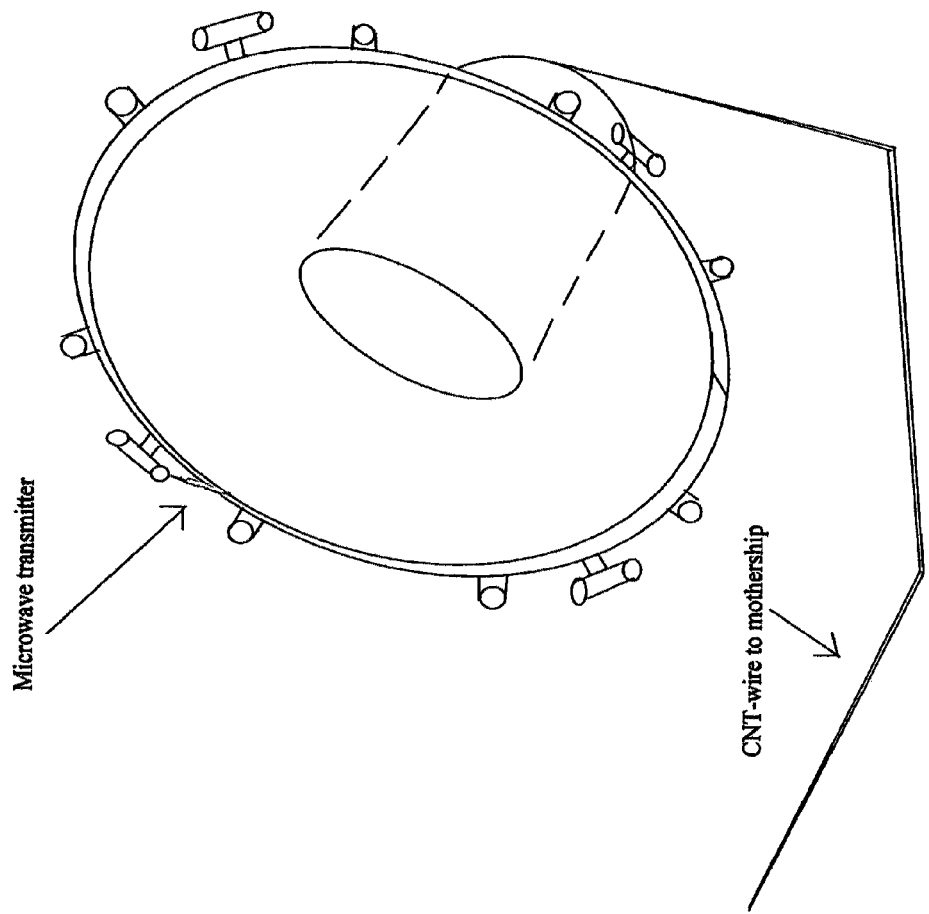
Figure 4.b
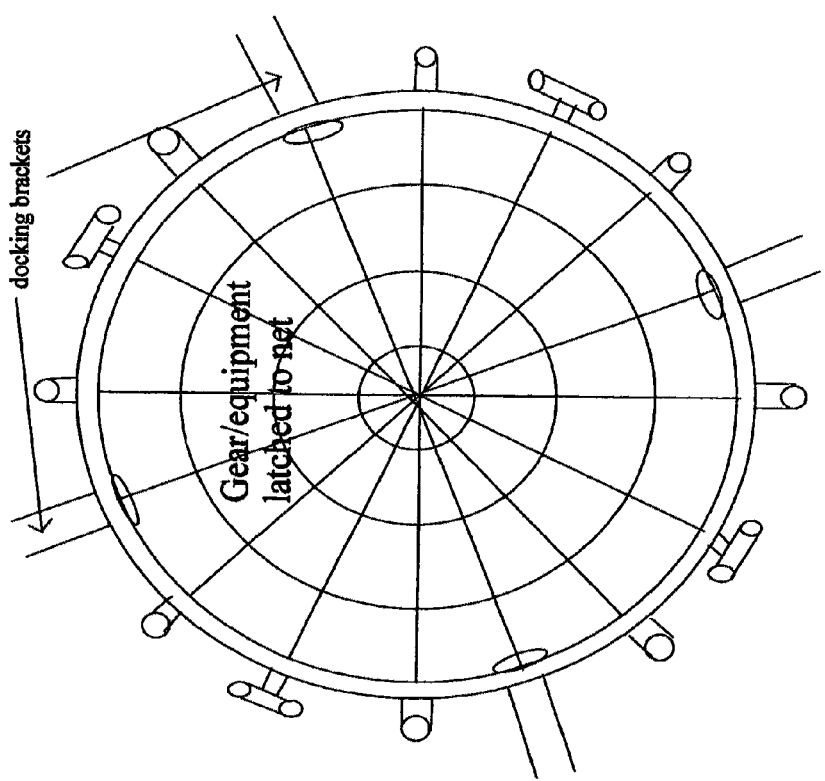
Figure 4.a

Fig. 4.c (Prior Art)
Mobile dockingable Thruster Unit (MTU)
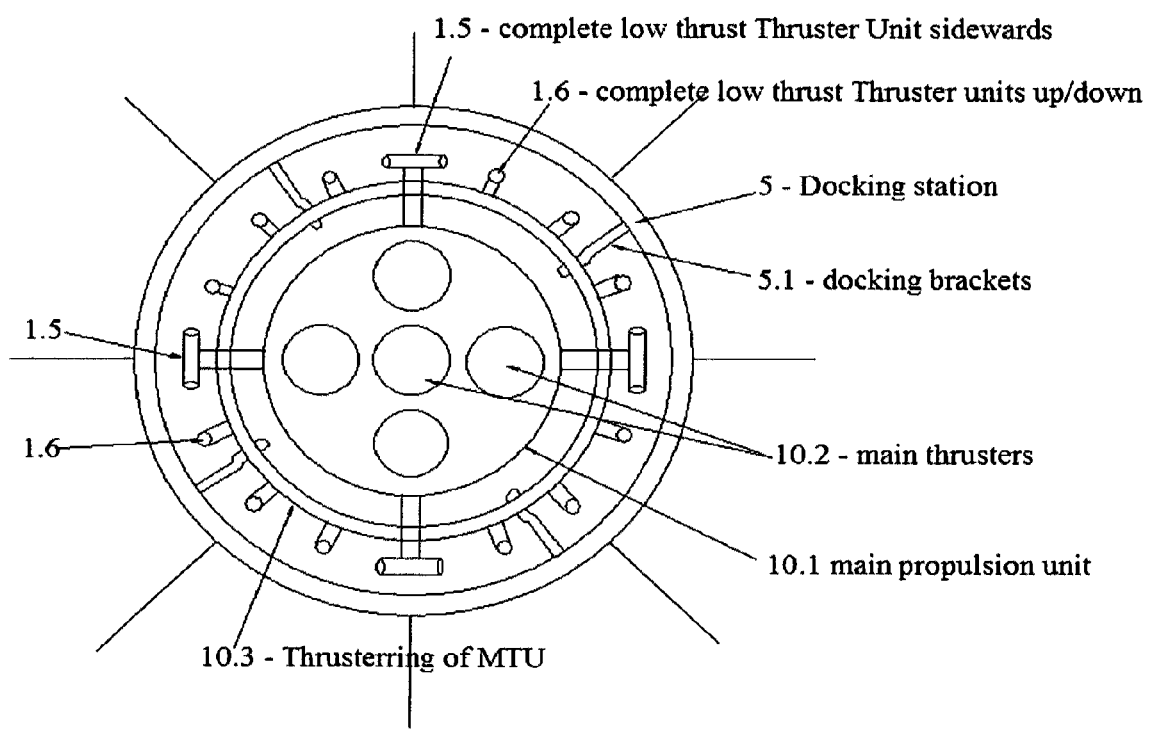

MOBILE SOLAR POWER STATION AND COUPLED SOLAR POWER STATIONS FOR SPACE BASED POWER GENERATION AND TRANSMISSION

REFERENCE TO RELATED APPLICATIONS

This application is a further development of earlier German patents of the inventor and his latest U.S. Pat. No. 7,913,953 (Solar Sail Launch System) and uses an improved "Roller-Reefing" version as enabling technology, which combines solar sail attitude control and station keeping with direct launch and deployment of large solar sail and solar cell areas.

The solar sail mothership spacecraft, one of the two main subjects of the mentioned US-invention, uses electric propulsion as second option of thrust and serves also as a mothership, which allows to carry several daughter units.

The properties of this U.S. patent are disclosed hereby by reference.

The Roller-Reefing technique for solar sail spacecraft was first invented for very large, space mounted solar sail spacecraft in the German patent application DE 10 2005 028 3780 by the author of this application. The already mentioned U.S. Pat. No. 7,913,953 employs Roller-Reefing now also for smaller, but direct launch- and space deploy-able solar sail mothership spacecraft.

Further related applications are "Solar sail for power generation" (U.S. Pat. No. 6,194,790) which concerns a solar sail for energy production covered with or made of thin film solar cells.

There is also Ikaros, a Japanese solar sail spacecraft already in space, which has shown that solar sailing by using solar radiation pressure works for acceleration. The solar sail carries already some solar cells for energy production on the sail foils.

The concept of space based solar power satellites was first patented by Dr. Peter Glaser in 1973, U.S. Pat. No. 3,781,647.

RELATED PAPERS

Frank Ellinghaus, Solar Sailing and solar power generation by "Roller-Reefing", ISSS 2010, New York, Jul. 20-22, 2010.

Frank Ellinghaus, Solar Sail Power Station, ISSS 2010, New York, presentation, Jul. 22, 2010.

Those papers can be downloaded at the inventor's web site (solar-thruster-sailor.info).

STATEMENT REGARDING FEDERALLY SPONSORED RESEARCH OR DEVELOPMENT

Not Applicable

MATERIAL SUBMITTED ON A COMPACT-DISC

Not Applicable

BACKGROUND OF THE INVENTION

1. Field of the Invention

The invention relates to power generation, energy-transfer and usage in space by a mobile Solar Sail Power Station spacecraft, which utilizes Roller-Reefing as fuelless means of station keeping, steering, attitude control and pointing, combined with enhanced energy production through additional usage of the solar sail foils as large solar cell arrays.

2. Description of the Related Art

The related US-patent U.S. Pat. No. 6,194,790 discusses a solar sail, made or covered with thin film solar cells which is guided towards Sun with the help of thrusters to produce electric power, while a power line connection feeds a nearby satellite.

A weak point of this concept is, that the power sail needs fuel for station keeping and attitude control to produce electric energy and that this craft is thought for rather immobile applications.

The thrusters are just thought to keep the sail pointed toward Sun, while the solar radiation pressure pushes the craft away of it.

Space based solar power satellites (SBPS) can only produce electricity, if they are pointing to a large degree towards Sun with large reflecting mirror or with solar-cell arrays. While doing this, they will be pushed away from the Sun by SRP-forces (up to about ≈4.5 N per km$^2$ of foil area in Earth orbit, if the foil is not reflecting).

Power satellites have to provide station keeping, attitude control and steering while pointing towards Sun (with mirrors or solar cell arrays for the power collecting unit) and pointing towards Earth (for the transmitting antenna or laser unit) and should preferably stay in GEO while the solar radiation pressure is pushing it.

For years of operation of a large power satellite, tons of fuel would have to be delivered to GEO if thrusters are used for station keeping and attitude control.—Just to keep a large SBPS in a stable orbit and to provide pointing and steering while the spacecraft is orbiting Earth and has to change continually it's pointing direction towards Sun to stay in the GEO-orbit.

Solar Sails on the other hand are thought for fuel-less space transportation, though most designs lack the capacity to handle payload AND daughter units and do not or only in a modest scope produce solar power.

Ikaros, the Japanese space probe, the first solar sail spacecraft, which is free flying and accelerating by solar radiation pressure (SRP) in space now, has already some solar cells integrated on the solar sail foils, but has no payload handling capacity and is because of it's spin stabilization (and the inherent inertia of such a large spinning plane) hard to steer.

Such a spinning craft would not be able, to point towards Sun and Earth at the same time.

The previous prior art solar-sail designs of the inventor do already feature a central payload and docking station for mother units and combine simple sail setting and reefing by "Roller-Reefing" and can use this technology also for steering, fuel-less station keeping and attitude control.

Roller-Reefing is also available for both, large space constructed solar sail spacecraft (see the inventor's German patent DE 10 2005 028 3780) and for direct launched craft without in space construction (see U.S.-patent U.S. Pat. No. 6,194,790).

There are already solar cells for power production integrated to the spacecraft structures, but only in modest scope. A possibility to use the full size of the large sail foils of the solar sail spacecraft for power production, was lacking until it has been proposed and published at and for the 2$^{nd}$ International Symposium on Solar Sailing in New York, (Jul. 20-22, 2010) by the inventor.

BRIEF DESCRIPTION OF THE DRAWINGS

FIG. 2—is the prior art reference design of a deploy-able solar sail mothership spacecraft as discussed in U.S. Pat. No. 7,913,953 (here shown in it's launcher payload department).

Those turning axles replace the usual 3-axis spacecraft stabilization.

FIG. 4.a-4.c represent 3 designs of a number of several possible daughter unit spacecraft, which are independent spacecraft, but can be carried by the SSPS-mothership.

FIG. 4.a is the basic design of a flat daughter unit with a net inside it's ring structure which would carry latched on gear and equipment.

FIG. 4.b shows a microwave transmitting daughter unit which would be connected to the SSDPS mothership through a CNT-power line.

FIG. 4.c shows a mobile thruster daughter unit (MTU), which when docked into the mother ship could serve as a changeable booster for the SSPS. Changing MTUs allows simple mobile refueling.

Figure 5:
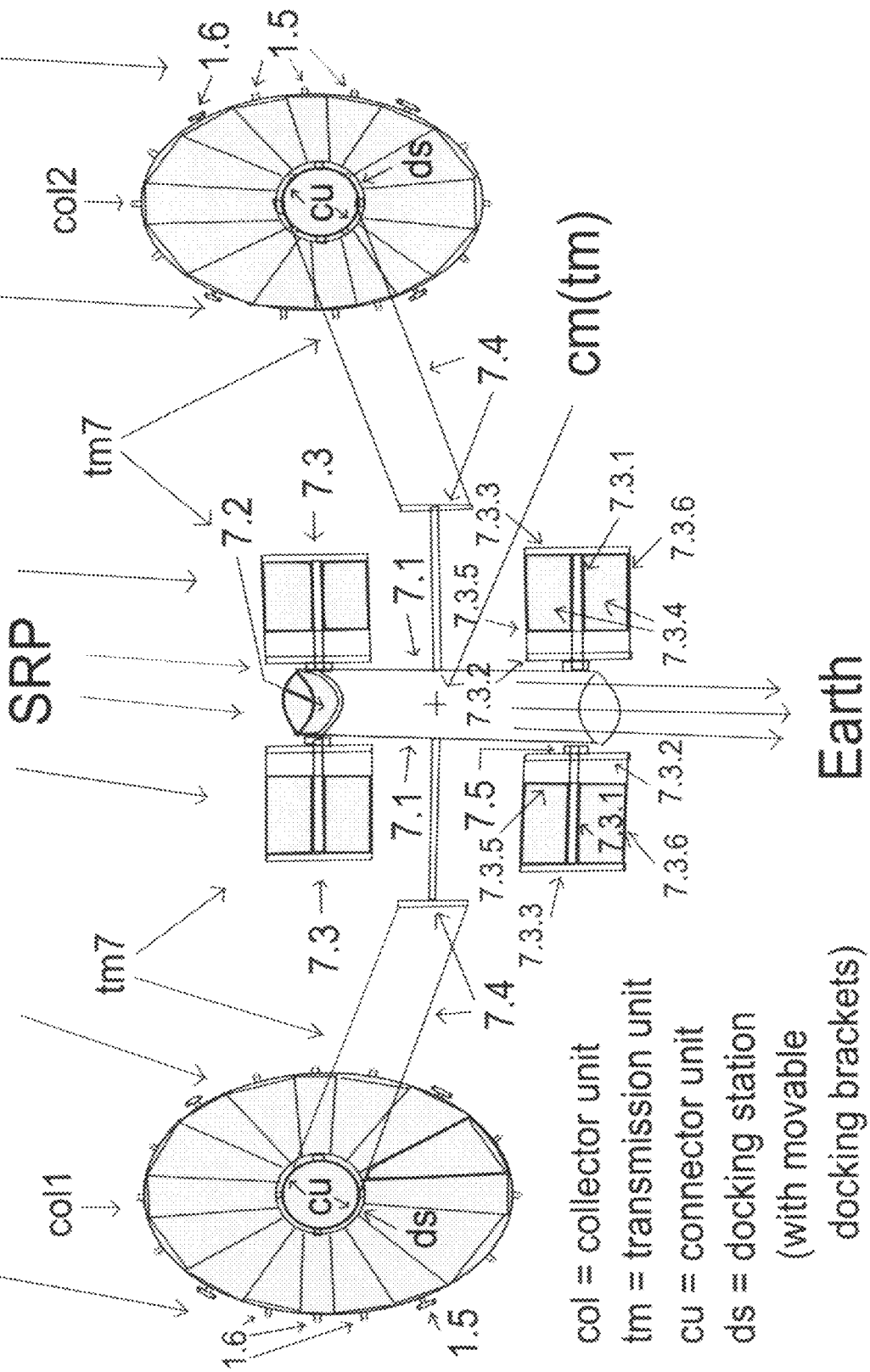

FIG. 5 shows a coupled SSPS, consisting of two collector units, which balance a transmission unit between each other. The connection of the collector units with the transmission unit is achieved with power cables through two connector daughter units, each docking into the docking station of the collector units.

DETAILED DESCRIPTION OF THE INVENTION

The invention is based on prior "Roller-Reefing" solar sail spacecraft designs of the inventor, especially as detailed in U.S. Pat. No. 7,913,953 which is disclosed hereby by reference.

Figure 3:
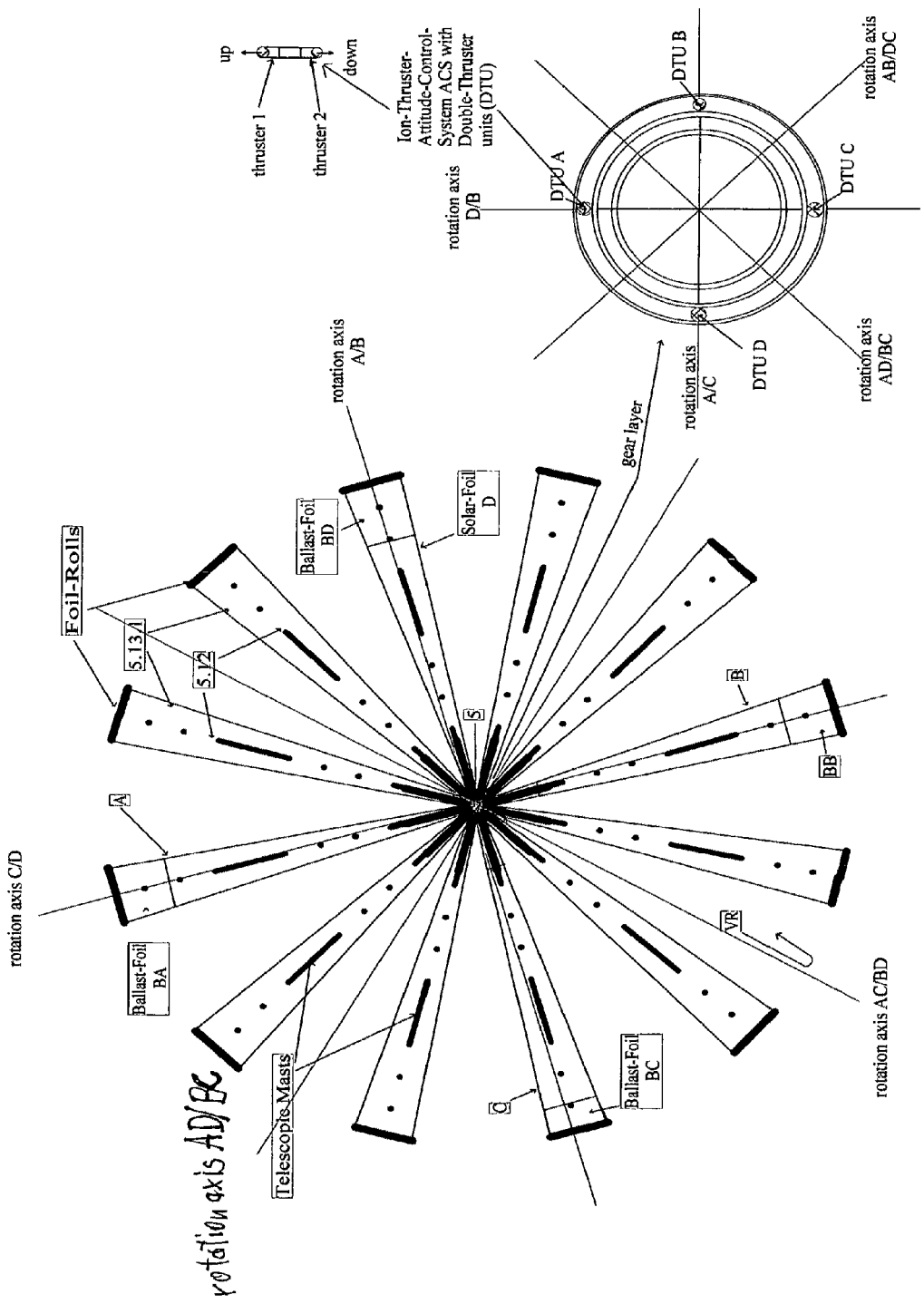
FIG. 3—shows a deployed solar sail power station (SSPS) and it's turning axles formed by Roller-Reefing and solar electric propulsion with double thruster units (DTU attitude control).

FIG. 3 of this referenced U.S.-patent is the base of FIG. 2 of the current application and shows a direct launch able mothership spacecraft, which is deployed in space.

It carries the furled sail foils on sail foil rolls, which are mounted on the tips of masts and unfurls the foils by winches, which pull the foils toward a central ring structure which includes a docking station for daughter units. Furling and unfurling of the foils, especially those with a ballast foil part, moves the center of mass into the opposite direction as the center of solar radiation pressure (SRP) moves.

FIG. 4 of the referenced U.S. Pat. No. 7,913,953 shows the design of a (preferably square km sized) space mounted solar sail mothership with an Outer Thrusterring. Those space mounted mothership designs are the base for the collector units shown in FIG. 5 of this current application. Here the sail foil rolls are mounted to an Outer Ring, which carries SEP double thruster units (DTU) also.

Roller-Reefing attitude control is the same as for the deploy-able design, again through moving, furling and unfurling of the foils with electric rolls and winches. The winches are attached again to an Inner Ring Construction, which includes a central docking and payload station.

The present invention is different to the mentioned designs by it's configuration of the sail foils as large solar cell arrays, which serve both—attitude control and steering as well as energy conversion.

Another novelty is the introduction of independent daughter units as energy transmitter and as connectors between two or more collector mothership units.

The invention can be used for both, for space mounted as well as for space deploy-able solar sail mothership spacecraft which are converted through the invention into Mobile Solar Sail Power Stations.

Roller-Reefing, has two main advantages for solar sail spacecraft.

a) It is a simple way to mount and/or deploy very large solar sail areas in space by splitting them in many sail foil panels which are furled onto rolls during deployment or construction of the spacecraft.

b) It allows to use solar sail panels for fuel-less station keeping and high precision steering and attitude control just by furling and unfurling the sail foils on and off their rolls. It also allows to reef the foils again if needed (for instance during a return mission to low orbit locations like the ISS orbit).

While conventional fuel less solar sail steering strategies mostly use center of mass displacement or/and pointing the solar sail into the wished direction, Roller-Reefing moves both, the center of mass and the center of solar radiation pressure of the craft into opposite directions.

Both center moves add to each other, which allows to enhance the turning performance.

Even though the existing Roller-Reefing designs are already carrying solar cell arrays (mainly on the central carrying structure), making the full area of the large solar sail arrays available for power production and usage, would be a huge performance advancement.

The scope of this invention is to create a mobile solar sail power station or power station chain for space based power generation and/or for mobile space missions with high energy demand like asteroid exploration and satellite services combined with the solar sailing properties of Roller-Reefing mother-ship spacecraft.

Thereby the full size of the sail foils of the existing Roller-Reefing solar sail spacecraft designs shall be used for energy production and distribution without deteriorating the solar sail spacecraft's steer ability and mobility.

Another aim of the invention is to allow simple automatic connection between two or more mother-ship spacecraft and/or one or more daughter unit(s) to enable the formation of an even larger solar power station/satellite, formed by multiple spacecraft.

Those tasks are accomplished as depicted in this application and the following claims.

Figure 1:
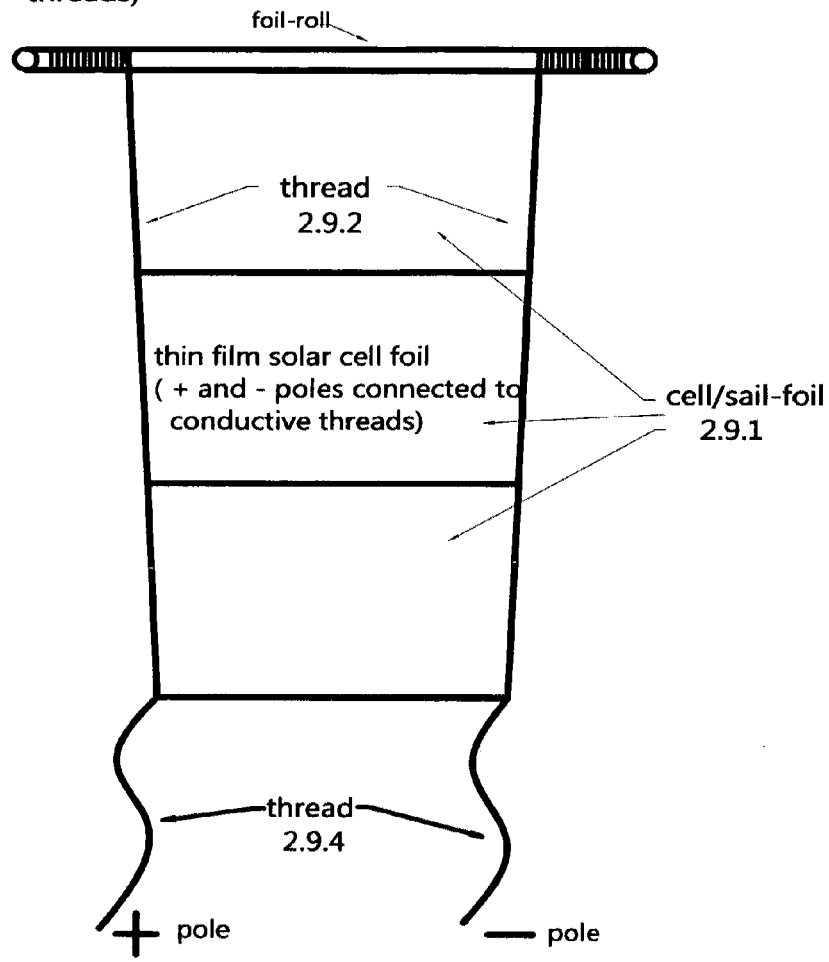
FIG. 1—shows the solar sail/solar cell foil 2.9 partly unfurled on a roll 1.11. The pulling threads 2.9.4 serve as well as structural members to take the load of tensile forces off the foils and also as power lines, which conduct the electric power produced by the foils thin film solar cells.
Figure 1A:
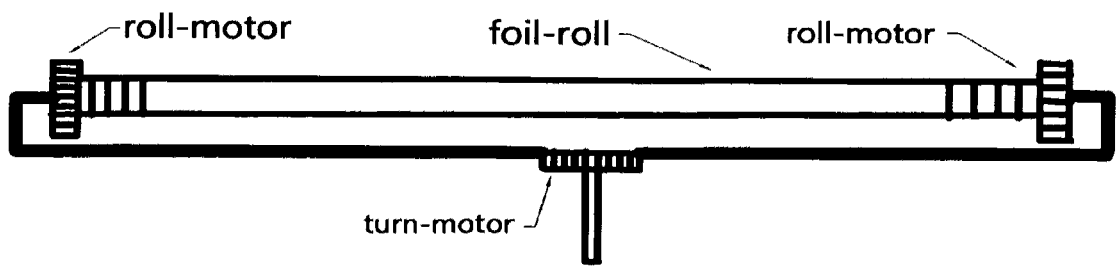

FIG. 1 shows the improved prior art design of a solar sail foil 2.9, partly unfurled on a sail foil roll 1.11.

The design was originally intended for the Roller-Reefing application for attitude control in solar sailcraft only.

Instead of being just sail foils, the foils used now are covered with or made of thin film solar cell foil and are now also used for energy collection by the solar cell arrays.

The plus and minus poles of the solar cells are connected to the pulling threads 2.9.4, one representing the plus line and one the minus line of a DC power transmission.

The pulling threads 2.9.4 and 2.9.2 serve two purposes at the same time. They are as well structural members to take the load of tensile forces off the foils and also as power lines, which conduct the electric power produced by the foils thin film solar cells—usually towards the center of the spacecraft.

There the electric energy can be used, stored and/or beamed toward Earth.

This seemingly small feature changes on the sail foils allows to use the whole solar sail mothership spacecraft as a collector unit.

Because of it's excellent space hardiness and tensile strength and it's good conductivity, isolated carbon nanotube (CNT) would be the preferred material for the pulling (and power) threads/lines.

As both solar sail mothership designs have already integrated attitude control by Roller-Reefing combined with SEP-propulsion and steering, no further design changes are needed to the collector unit which is a prior art solar-sail mothership design of the inventor also.

A space based power station has to collect energy while pointing towards Sun with the solar cell arrays while the transmitter of this energy has to point towards Earth (or another gravitation well, or destination) to beam this electric energy to a receiver station on the planet.

As a power satellite in GEO orbits Earth, while the collector unit is pointing towards Sun, it has to change its attitude in relation to Earth constantly, while the transmitting part of the satellite would have to point to the receiving station on Earth—not a trivial task for a craft, which changes constantly the attitude.

In another orbit targeting a destination and the Sun at the same time can be even harder, because both, the Sun and the beaming destination might move completely differently and into different directions. It therefor makes sense to separate the transmitter from the collecting parts so far, that the transmitting part has the ability, to stay pointed onto a fixed point on Earth (or onto another destination) while the collector moves.

This could be done through a daughter unit, shown in FIG. 4.*b*. The daughter carries the transmitter (in this case, a microwave transmitter) and is transported in the mothership's docking station. The mother could be a large space constructed or a smaller direct launched solar sail spacecraft.

To get into operation mode, the daughter takes off, before transmission happens. It can move like an independent spacecraft but is connected to the mother through a power cable (preferred CNT), which delivers the energy of the collector solar cells without the need of conversion.

Steering and attitude control is realized through DTU-propulsion, using electric thrusters, which will be explained later with FIG. 3.

The Outer Ring, which carries the thruster units, serves also as a handle for the movable docking brackets of the docking station.

A way, to couple two or more collector units without to use fuel for a separate transmission daughter unit, is the transmission unit tm7 shown in FIG. 5. The drawing is not to scale, since the collector units would preferable in the square km range each, while the transmission unit would be clearly smaller.

The transmission unit shown here is connected through two trapezoid constructions 7.4, each attached to a connector unit (cu) with two collector units (col1 and col2), which are Outer Ring space mounted large solar sail collector spacecraft with a central docking station (ds) each. It would be advantageous for attitude control, if the trapezoid constructions 7.4 are attached to the transmission unit on a level with it's center of mass.

The connector units cu are also independent Outer Ring daughter spacecraft with DTU-propulsion, which are able, to dock into a docking station ds and to pull out again.

The docking station has movable docking brackets, which hold the daughter and at the same time provide electric connection through the Outer Ring of the connector unit, when tightened. For this reason, both, the docking brackets and the Outer Ring of the daughter are equipped with conductive contacts to allow the electric connection of daughter and mothership.

From there the electric power is delivered to the inside of the transmission tube 7.1 through the towing ropes 7.4.3 (one of them representing the plus pole and one the minus pole), which are further guided through the trapezoid bar 7.4.2 into the trapezoid mast 7.4.1 to the transmission tube 7.1.

The towing ropes 7.4.1 are also isolated power lines, preferable woven CNT-material.

The trapezoid allows a pulling connection of the collector spacecrafts col1 and col2 to the transmitter tm7 without altering the ability of the transmitter to point with the help of it's own attitude control system towards Earth as long as the trapezoid masts are fixed near the mass center (cm(tm)) of the transmission unit.

The attitude control of the transmission unit is enabled through the combination of a gyroscope 7.2 in the upper end of the transmission tube 7.1, two roller reefing attitude control units 7.3, which are also mounted on the upper end of the transmission pipe 7.1, while two more units 7.3 are mounted on the lower (earthward pointing) end of the pipe.

The two control unit pairs 7.3 are also mounted opposite to each other, each on the other side of the tube.

The inventor provides prior art Roller-Reefing designs for large deploy-able mothership spacecraft as well as for even larger (huge) space mounted mother-ship spacecraft with Roller-Reefing attitude control. Since both designs combine Roller-Reefing with solar electric propulsion and attitude control through double thruster units, the same steering and attitude control principles can be used for both designs.

The solar electric propulsion option is very attractive for a spacecraft which is also a mobile SSPS and has ample energy available to accelerate the fuel ejection speed up to 250 km/sec. (with the new ESA-ESTEC DS4G Ion Thruster), which is about 8 times the efficiency of regular ion thrusters with about 30 km/sec.

To use such thrusters would be simply impossible for regular spacecraft and satellites, because the electric energy needed, to power such energy demanding thruster units, is simply not available.

A large space constructed SSPS on the other hand could use such thrusters and enhance the acceleration considerably, not only because the thrusters are 8 times as effective as the already effective ion thrusters but also, because at least 8 times less fuel would be needed for the same thrust which, when saved as payload, needs only to accelerate a much lighter craft.

As a long term orbit mission would also profit of the fuel-less station keeping and attitude control through Roller-Reefing, even longer and more demanding long term missions would be possible with a SSPS.

FIG. 2—is the prior art reference design of a deploy-able solar sail mothership spacecraft as discussed in U.S. Pat. No. 7,913,953 (here shown in it's launcher payload department).

The SSPS-design is based on the Solar-Sail-Launch-System, consisting of the System-Sail mothership spacecraft and the System-Launcher. Initially the mothership is latched in a stowed position to a rotation platform in the launcher's payload compartment. The solar cell foil rolls are mounted to the tips of telescopic masts, which are tilted upwards during launch. Daughter units are already docked inside the mothership's central docking- and payload station.

This docking-station is surrounded around it's middle by a plane layer of connected rings which serve as holding structure for further spacecraft equipment and gear, like thruster units, computer units, a bus-system and already mounted solar cells.

In principle the System-Sail spacecraft is scale able, primarily by enhancing the number of segments of the deploy-able telescope masts.

Anyway, to show the possibilities which emerge with this self deploying system, the inventor has determined the possible payload-volume, foil-area and electric energy for a System-Sail with 12 masts, each consisting of seven telescope segments, initially carried by an Ariane V™ ECA heavy lifter launcher.

Those 12 masts, each about 70 m long, when extended, would allow a foil area of 3120 sqm (260 sqm per mast), which is considerably more, as the International Space Station (ISS) carries now—after years of construction works!

This is launched in one single launch, self deploying, without further space construction works.

According to Kevin Reed of Welsom Space Power, space solar cells of 1.5 micron thin solar PV on radiation resistant polyimide would be available, which could produce 168 Watts in space per sqm of foil area.

The 3120 sqm would produce 524 kWp DC electricity, which is enough, to power one DS4G Ion Thruster mentioned before.

The solar cell foils would weigh about 32 kilograms for the reference design only.

In combination with the large docking and payload station of the mothership (28 cbm volume) a fast space transportation infrastructure could be built up, whereby daughter units would be used as docking-able containers, transported in a mothership which is used as container freighter. Refueling of this freighters could be done by Mobile Thruster Units (MTU), which are shown in FIG. 4.c.

Besides the docking station volume, an additional gear plane, formed by a layer of rings around the center of the docking station, is available. There additional gear and equipment could be mounted on 2×12.4 sqm (above and under the plane).

Deployment

As the deploy-able SSPS features solar sail capability and ion thruster propulsion, it can be launched besides to GEO also to low Earth orbit (LEO). The sail foils wouldn't be set until the influence-zone of the Earth-atmosphere is left. The possibility to launch to LEO with subsequent fuel efficient transfer to GEO by using high energy solar electric thrusters enables to squeeze launch costs one more time considerably.

When LEO or the point of service or destination orbit is reached, the launcher opens up like a flower, through a payload compartment hull which consists of a plurality of petal-like segments, corresponding in number to the number of said telescopic masts of the System-Sail, and are so mounted that each can be pivoted to open the compartment and pull one of the retracted telescopic masts into a common horizontal position, where winches pull the tilted foil rolls into the right angle.

After the rotation platform starts to rotate the strapped on System-Sail spacecraft, the segments of the telescopic masts are pulled by centrifugal forces into their extended position. Once this position is reached each mast segment is held by a snap in mechanism.

Attitude Control System (ACS), Station Keeping and propulsion The SSPS would feature several possibilities to manipulate attitude and movement as already shown in U.S. Pat. No. 7,913,953:

Roller-Reefing—by furling and unfurling of steering foils.
DTU-Configuration—electric propulsion through double thruster units.
Fuelless mass displacement through moving the daughter units insides the docking-station with movable docking-brackets.
Fuelless mass displacement through moving the payload insides the docking-station with winches.
Tilting the sail foil rolls around the poles of the masts to generate or avoid rotation about the pole of the power station's plane.

Roller-Reefing and DTU-Configuration are the main technologies of the SSPS for attitude control, pointing and steering, whereby Roller-Reefing is fuelless while DTU-Configuration allows to harness the whole power of a large SSPS for electric high speed thruster propulsion too.

If DTU's are located exactly on the center mast line of the steering foils, the steering axles of both technologies are also located at the same place. This means that seamless switching from Roller-Reefing to DTU-usage and conversely is possible without changing the actually used steering axis.

On top of that, combining the use of both technologies in the same process is also possible and enhances the available turning forces. FIG. 3 shows a deployed SSPS, in this case with 12 extracted telescopic masts 5.12 and set sail foils, one attached to each mast.

The smaller drawing part on the right of the deployed SSPS is an exploded and simplified view of the central ring structure, here with an Inner Ring, which is located in the middle of the docking-station and two rings mounted around it (mountings and the rings of the docking station above and under the Inner Ring are not shown).

Those rings form a gear plane, where additional gear and equipment can be mounted outside of the docking station. In this case 4 double thruster units are attached between the two additional rings around the Inner Ring.

Above the gear plane view another exploded view of one of the double thruster units with two thrusters in one jet tube is shown.

Attitude Control by Roller-Reefing

Four of the 12 foils are serving as steering foils and feature ballast foil segments (here marked as BA, BB, BC and BD) on their ends. The ballast foils are designed to reduce mechanical stresses onto the delicate sail or solar cell foils and to enhance the impact of steering forces. Therefore the ballast foils would be made of heavier and stronger materials as the regular foils. Those ballast foils only would be furled and unfurled for attitude control while the regular foils would stay principally straight, unless reefing the full or part of the large sail area is necessary. The big advantage of Roller-Reefing attitude control is the circumstance, that it works fuelless and hence allows to extend a satellite or power satellite mission substantially.

According to the number of steering foils, there are in the case of this drawing 4 rotation axles, which replaces the conventional 3-axis attitude control, common on satellites. A larger SSPS could use more steering foils and would provide accordingly more turning axles.

Two of the drawn rotation axles (actually rotation axis A/B and rotation axis C/D) are situated between two steering-foils, fixed on a diagonal line opposite of each other, each on the other side of the ring.

The other two rotation axles are situated between two combined pairs of steering foils, which results into the possibility, to double the possible turning force compared to the single pair solution.

In FIG. 3 the rotation axis AC/BD is formed between the combined steering foils A+B and D+C, while the rotation axis AD/BC resides between the combined DTU-pairs A+D and B+C.

Unfurling and furling the sail ballast panels (here ballast panels BA, BC, BD and BE) steers the sail craft through shifting the center of mass and at the same time shifting the center of light pressure into the opposite direction.

In contrast to a pure mass shifting ACS this Roller-Reefing and unfurling system adds two shifting processes for enhanced steering power in one single steering operation—(furling and unfurling the sail or ballast foil).

In this example the ballast panel BC of the panel C is only half way unfurled, while the ballast panel BD is fully unfurled, which reduces the C-foils sailing area and shifts the center of solar radiation pressure towards panel D on the opposite rim o the craft, while the center of mass is shifted toward panel C, since the mass of the whole foil is shifted toward the C-foil-roll at the outer end of the telescopic mast 5.12.

Attitude control and propulsion by double thruster units (DTU) FIG. 3 shows on the smaller drawing part on the right side an exploded view of the gear layer, around the central ring of the docking station with 4 DTUs attached between two rings of the layer.

The above drawn exploded view of a DTU illustrates the underlying principle of this attitude control and steering technology. In each DTU there are principally two thrusters mounted in the same jet tube, but opposite to each other with opposite injection direction (here one thruster firing upwards and the other firing downwards).

By switching from one to the other thruster of the used thruster units, it is possible, to slow down, stop or reverse an acceleration or a rotation initiated through DTUs, if the DTUs are also mounted pairwise as shown in the drawing.

This allows to turn the craft into every possible attitude and because of that circumstance provides pure thruster attitude control without the need of flywheel or gyroscopic assistance.

Daughter Units

Daughter units for the inventor's designs (solar sail mothership spacecraft and SSPS) are smaller independent spacecraft with an Outer Ring and attached DTUs for DTU-propulsion and attitude control.

They are designed for docking in the central docking and payload station of solar sails and SSPS.

Besides carrying the thrusters and latched in or strapped to gear and equipment those Outer Rings serve as the main skeleton and carrying structure of the craft and also as a handle for the movable docking brackets, which hold the daughter in the mothers docking station.

The docking brackets of the mothership provide power connections to the Outer Ring of the docked daughter when they hold the daughter. This enables to secure the power supply of the daughter unit through the mothership, for instance for recharging, when it is docked.

Four of a number of different possible daughter units are shown in FIGS. 4.a-4.c and 5.cu.

While FIG. 4.a (basic strap on daughter) and 4.c (Mobile Dockingable Thruster Unit—MTU) are prior art designs of the inventor, the daughters drawn in FIG. 4.c and FIG. 5 reference sign cu are new designs.

FIG. 4c—transmitter daughter unit—represents a simplified drawing of a daughter unit of an SSPS spacecraft with prior art Outer Ring design.

In addition it features a transmitter with an attached wire (preferred isolated CNT-material), while the other end of the wire is attached to the mothership. The CNT-wire serves as a power line and delivers the energy from the SSPS mothership with it's larger solar sail arrays, to the daughter, where the electric energy is used to power the daughter and the attached transmitter. The drawing here shows a microwave transmitter, but instead a laser transmitter (as shown in FIG. 5) could be attached also.

Even though, the SSPS-mothership has to point with it's large solar cell arrays towards Sun, the daughter as an independent spacecraft, can point independently towards the destination where the energy is intended to be delivered, for instance to a receiver station on Earth.

Reference sign cu in FIG. 5 symbolizes a connector daughter unit, which is an independent spacecraft docked into the mothership and when docked connected with a separate transmitter unit through a power wire which delivers the energy from the connector unit cu to the transmitter.

While in FIG. 5, only two connector units cu, connecting two collector motherships col1 and col2 with a transmission unit tm7 are displayed, a chain of even more collector units connected with one ore more transmitter units would be possible also.

SSPS as a Weapon

While sometimes it is claimed, that a space based power station cannot be used as a weapon when it is furnished with a microwave transmitter, because the transmission spreads over a large transmission area on Earth, it seams to be clear that it is also usable as a weapon, if used with a laser transmitter, as shown in FIG. 5.

The inventor doesn't want to witness the impact of a fired laser with the power of a fully featured SSPS, even a smaller deploy able one with "only" the power of 524 kWp constant DC electricity as calculated for the direct launch able reference design, when pointed onto gas or oil pipelines, nuclear power stations, bridges, chemical plants or highly explosive facilities.

If this "firepower" of the smaller deploy-able version would not be enough to do substantial harm to the target, using capacitors or accumulators for storing energy and giving it off in a short fire strike or chaining more collector units or just using huge, space mounted units as shown in FIG. 5 could enable to provide this possibility for most targets.

Therefore, the inventor has long hesitated to file this patent application. The main reason that this application is still filed, is the huge potential of this invention to avoid war about energy and to save the environment from burning fuel for energy production or from nuclear garbage through beaming the free energy, which is provided 7 days a week, 24 hours a day by our Sun to Earth.

In addition those high energy SSPS with their central large docking stations coupled with the possibility of fuelless station keeping, attitude control and steering by Roller-Reefing have the potential to build up a space transportation and mining infrastructure, which could help to get mining and smelting of materials and even fabrication of products off Earth and save our direct environment from those processes.

One more reason for filing is, that development of space based power satellites is already under way by other sides. Not filing would only slow the development process down,—if at all and through filing, the inventor has the possibility to propose his model to prevent the usage of SSPS or space based power satellites as weapons against Earth based humans and locations.

In times where military airplanes shoot down cars with lasers, claiming that solar power stations in space, equipped with lasers and a precision pointing and targeting system couldn't be used as weapons, would (rightfully) awake suspicions and fear among those, who don't possess such power stations.

The only way to calm down those fears and suspicions amongst nations, is to make sure, that all participating nations (especially the USA) waive the possibility to use those weapons against any location on Earth and authorize a common organization to deal with space based power stations.

In addition, all nations which become member of the organisation would be protected against hostile operations from other members through the constitution of the Space Power Union.

To name an (pressing) example, if Iran would become a member of the power union, it would become save against hostile actions of other member nations like the USA and would not need to build up a nuclear strike capacity.

The possibility, to get enough electric energy from space for all their needs, might even avoid the need for nuclear electric energy at all.

If Israel would become a member nation too, a major source of danger for both nations, Iran and Israel and for the world would be eliminated also.

In a world where the dangers of technology become ever larger while technological progress climbs upwards, it becomes more and more necessary to avoid acts of war, even for the mightiest nation of the Earth.

Integration is the solution, not confrontation and surveillance and the inventor hopes, that humanity is able to follow a path of integration for the good of all humans.

SSPS-operator Model of a Space Power Union

As the SSPS-operator model is based on self interest of all the actual main space powers on Earth, the chances to pull off such a project, are high as long the real space powers are few.

Only those few nations have to unite initially in the common goal and should do the first steps, while other developing nations could follow later—also to their own self interest.

Those powers are the US, the EU, Russia, China and Japan and maybe India.

Besides preventing war about energy,
economical and environmental reasons could be the driving forces to unite those countries in common goals.

The driving forces could be general Energy need, the wish to replace nuclear energy and it's waste products against electric energy and the wish to replace burning fossil fuel for energy production and transportation and help to build up a space transportation and mining infrastructure.

The EU, China, India and Japan are extremely dependent on Energy they can't actually generate enough energy on their own.

Even the energy and resource rich US and Russia are in need of ever more electric power, the US especially because of their wasteful handling of resources.

Electric power from space could reduce the need for oil and gas by replacing oil against electric power for power generation, cars, trucks and other transportation.

While Russia and Japan have burned their fingers with major nuclear accidents already (Tschernobyl and Fukushima) the US has been in luck until now, but Harrisbourg has shown, that they would need some more luck for the future also.

The replacement of oil against space electricity would reduce the oil dependency from political insecure suppliers and the enormous financial burdens onto the economies of the customer countries.

The money used to pay the annual oil bill would be now available to pay off debts of the financial crisis and pay the further development of space related economy and therefor stay in the former oil customer economies.

There is no reason for at least 4 of the 5 large space nations not to form a power union. Even for Russia the $5^{th}$ of the large space nations, which could profit short time of oil scarcity with it's huge oil and gas resources, the long time benefits would outweigh a possible short time gain and bring the reduction of the dependence on nuclear power production and an increase of it's space technology and industry as an important supplier of space equipment and services.

Furthermore, if the 4 other space nations would go ahead with a Power Union without Russia, which would be very well possible, they would gain nothing by not taking part in this venture.

Organization of a Space Power Union (SPU)

The purpose of the Space Power Union would be, to operate SSPS and space power satellites for their members with a staff, which is sworn to serve the reasons of their members, especially by power production, but also to protect Earth and humanity.

Members, which could be nations, but also large corporations (like power provider or aerospace companies) and institutions (like NASA and ESA) would be able to build, own and profit of SSPS they built and paid for, but they would not be allowed to operate them with their own staff.

The Union would operate all SSPS and power satellites for it's members for a percentage of the return and act according to the instructions of the SSPS/satellite owners as long as this does not infringe the Union constitution.

Besides delivering space electric energy, the Union would also take care, of the space security of their members, for instance by jamming or shooting down space missiles on their way onto their targets or by asteroid deflection with the SSPS lasers and also for removing space debris.

Nations would waive their sovereignty regarding space SSPS and power satellites in favor of the Union.

Emerging new space powers like India and Brasilia could join the Union as soon as the need arises.

As the second article of the Union constitution would forbid Union members to make war or perform hostile operations against another member, no risk would be associated for nations with this partly loss of sovereignty. On the contrary, security would be enhanced, since the Union shields those nations against space threats.

To prevent obstruction, national legislation and rules (like ITAR) which disallow transfer of technology are suspended between member nations and the Power Union.

As ITAR-free has become a reason for other nations, not to use US-gear in space at all, this might be a good opportunity for the US to get rid of this regulation at least regarding Union members, which severely hampered the competitiveness of the US space industry.

To enhance development of power satellites and space infra-structure, the Union should also set up a patent office and patent court for space related inventions.

All member nations, members and citizens of member nations would be allowed to use a Union patent or patent application without allowance of the patent holder.

Those, who hold an Union patent would be compensated by a fixed percentage of the production costs of patented commodities, but have no right to close out members or citizens of the member nations from using their patents.

In short, such a Power-Union would help to prevent war, enhance cooperation between nations, decrease the dependency on fossil fuel, help to save the environment on Earth, divert funds used for buying oil into the development of space technology, whereby the member nations economies are stipulated.

There is no reason, not to establish such a Power Union.

LIST OF REFERENCE SIGNS

Reference Signs for FIG. 5 col=collector unit
tm=transmission unit
cu=connector unit
ds=docking station (with movable docking brackets)
cm=center of mass
1.5=double thruster unit sidewards
1.6=double thruster unit up/down
tm7 transmission unit
7.1=transmission tube
7.2=Gyroscope
7.3=Roller-Reefing Attitude Control Unit
7.4=trapezoid construction
7.5=mast servo motor (reverse able)
7.3=Roller-Reefing Attitude Control Unit→consisting of
7.3.1=control mast
7.3.2=foil roll inwards with reverse able roll motor(s)
7.3.3=foil roll outwards with reverse able roll motor(s)
7.3.4=attitude control foil
7.3.5=batten/bar or reinforced hem
7.3.6=2 or more control ropes
7.4=trapezoid construction→consisting of
7.4.1=trapezoid mast
7.4.2=trapezoid bar
   7.4.3=2 trapezoid towing rope(s)

SUMMARY OF THE INVENTION

A Mobile Solar-Sail-Power-Station for space-based power-generation and transmission is introduced, which is based on "Roller-Reefing".

Originally designed for solar sailing only, Roller-Reefing has evolved and does now allow, to launch large deploy able or mount huge Solar-Sail-Power-Stations in space, by using thin film solar cell arrays for both, for power production and for propulsion and attitude control.

This technology combines solar sailing and space based solar power generation, while the plenty electric energy available allows to move the mobile power stations with high speed electric thrusters.

The Mobile-Solar-Sail-Power-Stations described in this application can also be automatically coupled to a chain of power stations through docking of connector daughter unit spacecrafts.

In addition, the invention features a transmission unit with her own fuelless attitude control system for fuelless attitude control and pointing, which can be automatically coupled by connector daughter units.

The invention claimed is:

1. A Coupled Solar-Sail-Power-Station System for Space based power generation and transfer comprising:
   two or more collector unit mothership spacecraft, said two or more mothership spacecraft each having solar cell arrays and a central docking station;
   two or more connector unit daughter spacecraft, said two or more daughter spacecraft each having an outer thruster ring for steering and attitude control;
   one or more transmission units for transmitting energy collected by the solar cell arrays;
   wherein said central docking stations have movable and conductive docking brackets configured to hold the outer thruster ring of a respective one of said two or more daughter spacecraft,
   wherein electric power is supplied to said one or more transmission units via power cables, said power cables being connected at one end to one of said one or more transmission units and at a second end to one of said two or more daughter spacecraft.

2. The Coupled Solar-Sail-Power-Station System according to claim 1, wherein said two or more collector unit mothership spacecraft further comprise:
   a central ring structure located in the middle of the mothership spacecraft, said central ring structure being part of said central docking station;
   double thruster units mounted to the mothership spacecraft;
   a plurality of sail foils covered with or made of said solar cell arrays, wherein the solar cell arrays are rollable and flexible;
   sail foil rolls connected on a most distal end of each of the sail foils to roll holders, the sail foil rolls having electric motors for furling and unfurling of the sail foils;
   conductive wires connected along edges of the plurality of sail foils, and connected at one end to the sail foil rolls and at a second end to winches mounted on the central ring structure;
   wherein said sail foil rolls and winches pull on the conductive wires for attitude control and steering of the mothership spacecraft; and
   wherein said conductive wires direct electric power from the solar cell arrays toward the center of the mothership spacecraft or from the center of the mothership spacecraft toward the most distal end of the sail foils.

3. The Coupled Solar-Sail-Power-Station System according to claim 1, wherein the one or more transmission units further comprise:
   a transmission tube with transmission electronics;
   one or more gyroscopes; and
   roller-reefing attitude control units;
   wherein the transmission tube with transmission electronics comprises a laser or microwave unit.

4. The Coupled Solar-Sail-Power-Station System according to claim 3, wherein:
   the power cables form trapezoid constructions which tensely support said one or more transmission units between said two or more connector unit daughter spacecraft; and
   attitude control of said one or more transmission units being enabled with said one or more gyroscopes and roller-reefing attitude control units.

5. The Coupled Solar-Sail-Power-Station System according to claim 4, wherein:
   the transmission tube points towards Earth or another beaming destination and the one or more gyroscopes are attached to an end of the transmission tube opposite of Earth or another beaming destination; and the power cables are guided through the trapezoid constructions and further guided through a trapezoid bar into a trapezoid mast and to the transmission tube.

6. The Coupled Solar-Sail-Power-Station System according to claim 3, wherein:
    said roller-reefing attitude control units are rotatably supported on the transmission tube by a mast, said mast being rotated by an electric motor; and
    said roller-reefing attitude control units are connected in pairs on opposite sides of the transmission tube.

7. The Coupled Solar-Sail-Power-Station System according to claim 6 wherein:
    said roller-reefing attitude control units are equipped with two foil rolls having reversible roll motors, one foil roll mounted at or nearby a foot of the mast and one foil roll mounted at or nearby a tip of the mast,
    whereby rollable foils are attached to both foil rolls with two or more foil threads through battens, bars, or reinforced hem.

8. The Coupled Solar-Sail-Power-Station System according to claim 3, wherein attitude control of the transmission unit is done by at least one of:
    said one or more gyroscopes,
    rotating said roller-reefing attitude control units, and
    selectively furling and unfurling rollable foils of said roller-reefing attitude control units.

* * * * *